May 18, 1965  B. J. EISEMAN, JR  3,184,533
METHOD AND APPARATUS FOR PREVENTING CARBON DEPOSITS
IN ELECTRICAL APPARATUS CONTAINING
ELECTRONEGATIVELY SUBSTITUTED
DIELECTRIC FLUIDS
Filed Aug. 16, 1961
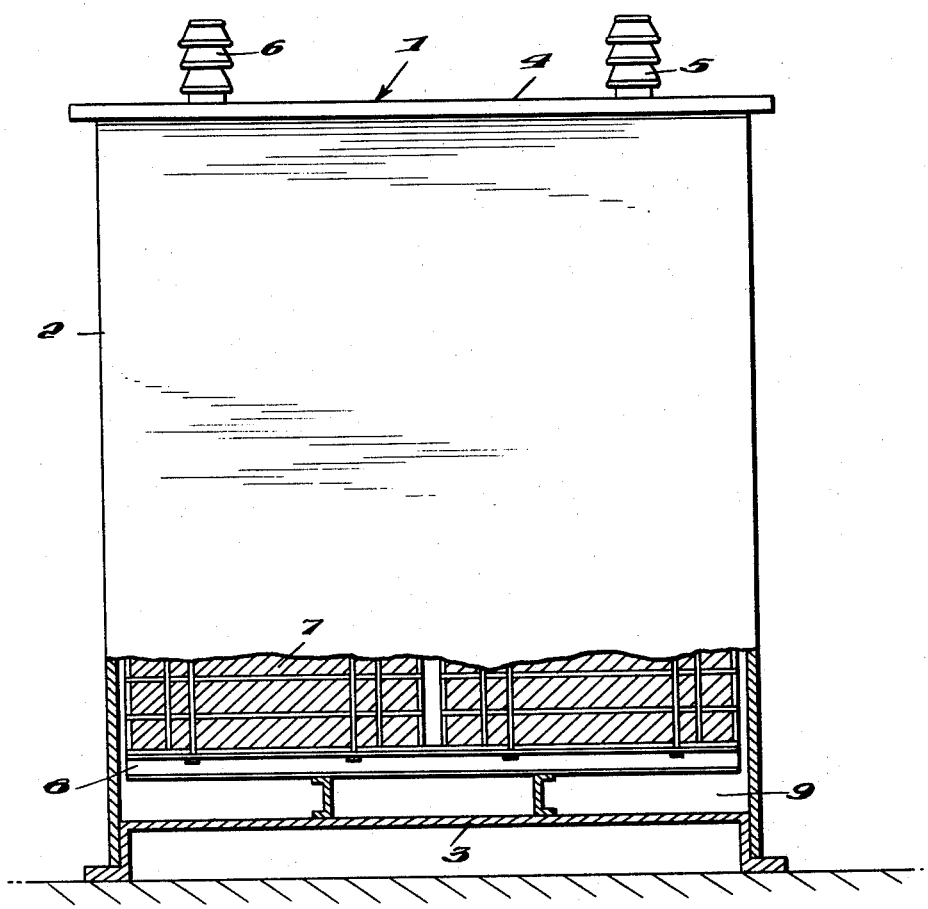
INVENTOR
BERNHARDT J. EISEMAN, JR.
BY *Robert C. Kline*
ATTORNEY United States Patent Office 3,184,533
Patented May 18, 1965

3,184,533
METHOD AND APPARATUS FOR PREVENTING CARBON DEPOSITS IN ELECTRICAL APPARATUS CONTAINING ELECTRONEGATIVELY SUBSTITUTED DIELECTRIC FLUIDS
Bernhardt J. Eiseman, Jr., Wilmington, Del., assignor to E. I. du Pont de Nemours and Company, Wilmington, Del., a corporation of Delaware
Filed Aug. 16, 1961, Ser. No. 131,858
20 Claims. (Cl. 174—17)

This invention relates to a method for preventing or diminishing the formation of carbon in dielectric fluids during electrical discharges therein, to novel dielectric mixtures, and to electrical apparatus containing said novel dielectric fluids. More particularly, this invention relates to a method for preventing or diminishing the formation of carbon in dielectric fluids during electrical discharge by the use of additives, to dielectric fluids containing said additives, and to electrical apparatus having electrical conductors contacted with said novel dielectric fluids.

For some years it has been known that certain electronegatively substituted carbon compounds are highly useful fluid insulators in electrical apparatus. Typical examples are dichlorodifluoromethane, octafluorocyclobutane, hexafluoroethane, octafluoropropane, decafluorobutane, trichlorofluoromethane, dichlorotetrafluoroethane, tetrafluoromethane, chloropentafluoroethane and chlorotrifluoromethane. While all of the above have reasonably good dielectric strengths, it is impossible to prevent spark-over or other electric discharge from occurring in apparatus containing these materials as high voltage surges develop. The spark-over or other discharge leads to decomposition and the formation of carbon, which, being an electrical conductor, not only shortens the gap between conductors, but also eventually leads to carbon bridge short circuits. This is a serious problem which has plagued the electrical industry for years.

It is an object of this invention to provide a method for preventing or diminishing the formation of carbon in organic containing fluid dielectrics. It is a further object of this invention to provide a method for preventing or diminishing carbon formation in organic containing fluid dielectrics which does not impair the dielectric strength of the fluid system. A still further object of this invention is to provide an electrical apparatus containing a conductor from which a discharge may occur in contact with a novel dielectric fluid mixture which prevents or diminishes the formation of carbon during electrical discharge. Another object of this invention is to provide novel dielectric fluid mixtures which prevent or diminish the formation of carbon during electrical discharges through said mixture. Other objects of this invention will appear hereinafter.

These and other objects of this invention are accomplished by providing a method for preventing or diminishing the formation of carbon in a dielectric fluid during an electrical discharge from electrical conductors which comprises contacting said conductors with a dielectric fluid mixture comprising an electronegatively substituted carbon-containing compound which forms carbon deposits when subjected to electric sparking, arcing, or other electric discharge and from 1 to 50 mole percent of an oxygen-containing oxidizing agent which does not react with the carbon-containing compound.

This invention further provides an electrical apparatus comprising an electrical conductor inside a case, containing as the fluid dielectric the mixture described above.

The features of this invention may best be understood by reference to the accompanying drawing.

The transformer 1 comprises an outer shell 2 fitted with a hermetically sealed bottom 3 and a sealed top 4 cooperating to produce a gas-tight enclosure for the elements of the transformer. The top 4 of the transformer is fitted with bushings 5 and 6 for the high voltage and low voltage connections. The bushings are fitted with hermetic seals to prevent escape of the gases from within the casing or leakage of air into the casing if used at subatmospheric pressure. Within the casing are the windings 7, supported on a frame 8 which is fitted to the bottom 3. The space 9 within the casing surrounding the windings 7 is filled with the fluid dielectric of this invention. The casing may be filled in a variety of ways, the simplest being to evacuate the casing via a suitable fitting and then admitting the dielectric into the evacuated casing.

In a preferred embodiment of this invention the carbon-containing compound is a saturated polyhalohydrocarbon, a saturated perhalohydrocarbon, a saturated perfluoroether, or a saturated perfluorotertiary amine and the oxidizing agent is sulfur dioxide, nitric oxide, or nitrous oxide.

The dielectric fluid mixtures of this invention comprising a saturated polyhalohydrocarbon compound, a saturated perhalohydrocarbon, a saturated perfluoroether, or a saturated perfluorotertiary amine having from 1 to 50 mole percent sulfur dioxide, nitric oxide or nitrous oxide are novel compositions of matter.

It has been found that little or no improvement is obtained in compositions containing less than one mole percent of the oxidizing agent. On the other hand, if the composition contains greater than fifty mole percent oxidizing agent, the carbon-containing material is diluted to such an extent that it ceases to be useful for the desired purpose.

Fluid dielectrics are used in a variety of types of electrical apparatus. The major types are transformers such as those disclosed in U.S. Patent 2,837,724, vaporization cooled transformers (U.S. Patent 2,777,009), gas filled electric cables (U.S. Patent 2,274,031), circuit breakers (U.S. Patent 2,816,990) and the like. They are also used in capacitors provided their dielectric constants and power factors are satisfactory for such applications.

An electronegatively substituted carbon-containing compound, for the purpose of this invention, is a carbon compound substituted predominantly with elements having electronegativities greater than carbon, i.e., oxygen, fluorine, chlorine and bromine. Camilli et al. (Transactions of the American Institute of Electrical Engineers, Part I, Communications and Electronics, vol. 72, pages 93–102 for 1953) have discussed (p. 99) the meaning of electronegativity as applied to dielectric fluids, primarily the haloalkanes, and why they are good dielectrics. Typical examples of electronegatively substituted carbon-containing dielectrics are: trifluoromethane, chlorodifluoromethane, chlorotrifluoromethane, dichlorodifluoromethane, trichlorofluoromethane, hexafluoroethane, octafluoropropane, decafluorobutane, dodecafluoropentane, chloropentafluoroethane, dichlorotetrafluoroethane, trichlorotrifluoroethane, difluorotetrachloroethane, octafluorocyclobutane, perfluorodimethylcyclobutane, bromotrifluoromethane, $(CF_3)_2O$, cyclic $C_8F_{16}O$, $(CF_3)_3N$ and the like. These compounds are illustrative of perfluoroalkanes, halofluoroalkanes, perfluorocycloalkanes, and halofluorocycloalkanes having from one to six carbon atoms, straight-chain and cyclic perfluoroethers, and perfluorotertiary amines. In a preferred embodiment of this invention the ethers contain no more than about eight carbon atoms, the amines contain no more than about twelve carbon atoms, and the atomic number of the halogen is no greater than 35.

Certain other compounds fit the general definition but are not useful dielectrics and therefore not part of this invention, either because of their poor physical properties (i.e., high melting points), poor dielectric strength or high toxicity. These include carbon dioxide, cyanogen, carbonyl fluoride, carbonyl chloride (phosgene), carbonyl bromide, cyanogen chloride, cyanogen fluoride, cyanogen bromide, hydrogen cyanide, formic acid, urea, oxalic acid and the like.

The oxidizing agents of this invention must fit certain specifications. Primarily, they must not attack the dielectric fluid itself. Since fluid dielectrics include both gaseous and liquid materials, the oxidizing agent must be gaseous if the dielectric is gaseous, or at least have a sufficiently high vapor pressure to be effective, or soluble to some extent in liquid dielectrics. The oxidizing agents, in their effective concentrations, should not adversely affect the dielectric strength of the dielectric mixture to any great extent and, for the sake of metallic equipment, should not be highly corrosive.

The more successful and preferred oxidizing agents are sulfur dioxide, nitrous oxide, and nitric oxide (NO). Of these, sulfur dioxide and nitrous oxide are to be preferred species.

Certain materials which would appear to be potentially useful oxidizing agents are found to be unsuccessful. A typical example is perchloryl fluoride ($FClO_3$) which has no effect under the conditions tested.

It is, of course, understood that the present invention is useful only with those carbon-containing dielectrics which form carbon in an electric discharge. Although it does no harm to include these oxidizing agents in other types of dielectrics, they serve no useful purpose. It must also be understood that these oxidizing agents should not be used with carbon-containing dielectrics which are hydrocarbons or hydrocarbon derivatives, if the hydrocarbon type compounds are attacked by the oxidizing agents and seriously degraded—a result which is, naturally, undesirable.

There is a theory that spark-over in fluid dielectrics take place via the vapor phase. This is true even with liquid dielectrics, spark-over occurring through bubbles of vapor in the liquid. For this reason, gaseous agents can be used successfully with liquid dielectrics since the dissolved gas will be present in any gas bubbles formed.

The following examples illustrate the present invention. The apparatus described below is designed to facilitate detection of carbon formation during electric discharge for experimental purposes. It should be understood that an electric discharge can occur in any electrical apparatus wherein an imperfection exists in the solid insulation of a conductor or where the conductor is uninsulated or where excessive voltages develop and that the method described herein is applicable to any situation wherein carbon formation occurs in a carbon-containing fluid dielectric. The examples illustrate the prevention or diminution of carbon formation and not the particular types of apparatus to which the method may be applied.

The test apparatus comprises a 500-ml. three-necked "Pyrex" glass flask. In one neck an electrode consisting of a copper wire, an alligator clamp and a steel sewing needle is passed through a rubber stopper. In the second neck, an electrode consisting of a piece of a ¼ inch O.D. copper tubing, crimped and soldered at the end in the flask, is passed through a rubber stopper. The third neck is used to admit and remove the dielectric mixtures. The point of the steel needle is placed about ⅛ inch from the copper tube electrode. The whole apparatus is made vacuum tight by sealing with beeswax.

When a mixture of gaseous dielectrics is being tested, the gas of the lower molecular weight is loaded first into the evacuated flask; than the other gas is admitted. A small area of the flask is then heated with a flame to set up convection currents in the gas mixture and then allowed to cool. After repeating several times, the gases are thoroughly mixed. Then the electrodes are connected to a 10,000-volt oil-burner ignition transformer (secondary rated at 23 milliamperes). A needle is used as one electrode to concentrate the electric discharge, facilitating observations of carbon formation, and to permit discharge to take place at greater electrode separation or at higher pressures.

EXAMPLE I

When the above-described apparatus is charged with perfluorocyclobutane to a total pressure of 760 mm. Hg and the electrodes connected to the transformer, spark-over occurs which is continued intermittently for seven minutes and the condition of the contents of the flask observed. Continuous spark-over cannot be used because the heat developed will melt the steel needle. At the end of the seven-minute period there is a heavy deposit of carbon on the electrodes.

After cleaning and reassembling the same apparatus, except that a new needle is used, nitrous oxide is admitted to the flask to a pressure of 190 mm. Hg. Perfluorocyclobutane 570 mm. Hg, 75 mole percent of sure to 760 mm. Hg pressure (partial pressure of perfluorocyclobutane and 570 mm. Hg, 75 mole percent of gas mixture). The gases are mixed and sparked as described above. Very little carbon forms during the early stages of sparking and at the end of seven minutes very much less carbon had formed than in the case of perfluorocyclobutane alone.

The above test was repeated using 17.5 mole percent, 10 mole percent and 5 mole percent $N_2O$ in perfluorocyclobutane at a total pressure of 760 mm. Hg. The results are tabulated below. The previous two tests are included for comparison. The tests are shown in increasing order of carbon formation.

*Table I*

[Total pressure 760 mm. Hg]

| Run No. | PP[1] perfluorocyclobutane, mm. Hg | PP[1] $N_2O$, mm. Hg | Mole percent $N_2O$ | Carbon deposition |
|---|---|---|---|---|
| 1 | 760 | 0 | 0 | Heavy. |
| 2 | 722 | 38 | 5 | Fairly heavy, less than #1. |
| 3 | 684 | 76 | 10 | Medium, less than #2. |
| 4 | 627 | 133 | 17.5 | Medium, less than #3. |
| 5 | 570 | 190 | 25 | Light, less than #4. |

[1] Partial pressure.

EXAMPLE II

In the same manner as Example I, the data shown in Table II are determined.

*Table II*

| TP,[1] mm. Hg | PP[2] perfluorocyclobutane, mm. Hg | PP[2] $SO_2$, mm. Hg | Mole percent $SO_2$ | Carbon formation |
|---|---|---|---|---|
| 780 | 390 | 390 | 50 | Light. |
| 768 | 383 | 385 | 50 | Do. |
| 430 | 380 | 50 | 12 | Very light. |
| 510 | 380 | 130 | 25 | Very very light. |
| 760 | 722 | 38 | 5 | Medium. |

[1] Total pressure.
[2] Partial pressure.

EXAMPLE III

In the same manner as Example I, the data shown in Table III are obtained.

*Table III*

| TP,[1] mm. Hg | PP [2] perfluorocyclobutane, mm. Hg | PP [2] NO, mm. Hg | Mole percent NO | Carbon formation |
|---|---|---|---|---|
| 759 | 380 | 379 | 50 | Very light. |

[1] Total pressure.
[2] Partial pressure.

Substitution of any one of the following for perfluorocyclobutane in the preceding examples gives essentially similar results, i.e., heavier carbon formation with no oxidizing agent present and diminished or no carbon formation with the added oxidizing agents: trifluoromethane, chlorodifluoromethane, chlorotrifluromethane, dichlorodifluoromethane, trichlorofluoromethane, hexafluoroethane, octafluoropropane, decafluorobutane, dodecafluoropentane, chloropentafluoroethane, dichlorotetrafluoroethane, trichlorotrifluoroethane, difluorotetrachloroethane, perfluorodimethylcyclobutane, dichlorofluoromethane, bromotrifluoromethane, perfluorodimethyl ether, cyclic $C_8F_{16}O$ (2-perfluorobutylperfluorotetrahydrofuran) and tris-trifluoromethyl)amine.

EXAMPLE IV

As noted earlier, it is necessary that the added oxidizing agent not detrimentally affect the dielectric strength of the main dielectric gas. This has been found to be the case with the oxidizing agents of this invention as the data in Table IV demonstrate.

*Table IV*

| Total pressure | Mole percent gas in perfluorocyclobutane | Dielectric strength, kilovolts |
|---|---|---|
| 3 atm | 0 | 42.5 |
| 3 atm | 25 ($SO_2$) | 43.5 |
| 3 atm | 50 ($SO_2$) | 38.0 |
| 3 atm | 25 ($N_2O$) | 39.75 |
| 3 atm | 50 ($N_2O$) | 36.0 |
| 0.5 atm | 0 | 10.5 |
| 0.5 atm | 25 ($N_2O$) | 9.75 |
| 0.5 atm | 50 ($N_2O$) | 7.75 |

These dielectric strengths were measured in a glass apparatus with two ½ inch steel spherical electrodes separated by a 2 mm. gap using a transformer capable of developing the needed secondary voltages.

It should be noted that sulfur dioxide actually increases the dielectric strength at lower concentrations.

The preceding representative examples may be varied by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for diminishing the formation of carbon in a dielectric fluid during an electrical discharge from an electrical conductor which comprises maintaining in contact with said electrical conductor during operation an electronegatively substituted dielectric fluid mixture consisting essentially of a carbon containing fluid selected from the group consisting of trihalomethane and $C_1$–$C_6$ saturated perhalohydrocarbon, wherein said halogen is of atomic number not more than 35 and at least one fluorine atom, $C_2$–$C_8$ saturated perfluoroether, and $C_3$–$C_{12}$ saturated perfluorotertiary amine, and from 1 to 50 mole percent of an oxidizing agent selected from the group consisting of sulfur dioxide, nitric oxide, and nitrous oxide.

2. A process for diminishing the formation of carbon in a dielectric fluid during an electrical discharge from an electrical conductor which comprises maintaining in contact with said electrical conductor during operation an electronegatively substituted dielectric fluid mixture consisting essentially of a trihalomethane, wherein said halogen is of atomic number not more than 35 and having at least one fluorine atom, and from 1 to 50 mole percent of an oxidizing agent selected from the group consisting of sulfur dioxide, nitric oxide, and nitrous oxide.

3. A process for diminishing the formation of carbon in a dielectric fluid during an electrical discharge from an electrical conductor which comprises maintaining in contact with said electrical conductor during operation an electronegatively substituted dielectric fluid mixture consisting essentially of a $C_1$–$C_6$ saturated perhalohydrocarbon, wherein said halogen is of atomic number not more than 35 and having at least one fluorine atom, and from 1 to 50 mole percent of an oxidizing agent selected from the group consisting of sulfur dioxide, nitric oxide, and nitrous oxide.

4. A process for diminishing the formation of carbon in a dielectric fluid during an electrical discharge from an electrical conductor which comprises maintaining in contact with said electrical conductor during operation an electronegatively substituted dielectric fluid mixture consisting essentially of a $C_2$–$C_8$ saturated perfluoroether and from 1 to 50 mole percent of an oxidizing agent selected from the group consisting of sulfur dioxide, nitric oxide, and nitrous oxide.

5. A process for diminishing the formation of carbon in a dielectric fluid during an electrical discharge from an electrical conductor which comprises maintaining in contact with said electrical conductor during operation an electronegatively substituted dielectric fluid mixture consisting essentially of a $C_3$–$C_{12}$ saturated perfluorotertiary amine and from 1 to 50 mole percent of an oxidizing agent selected from the group consisting of sulfur dioxide, nitric oxide, and nitrous oxide.

6. An electrical apparatus comprising, in combination, a closed, gas-tight container, an electric device therein having at least one conducting member from which an electrical discharge may occur, and an electronegatively substituted dielectric fluid mixture in said container and in contact with said conducting member, said electronegatively substituted dielectric fluid mixture consisting essentially of a carbon containing fluid selected from the group consisting of trihalomethane and $C_1$–$C_6$ saturated perhalohydrocarbon, wherein said halogen is of atomic number not more than 35 and having at least one fluorine atom, $C_2$–$C_8$ saturated perfluoroether, and $C_3$–$C_{12}$ saturated perfluorotertiary amine, and from 1 to 50 mole percent of an oxidizing agent selected from the group consisting of sulfur dioxide, nitric oxide and nitrous oxide.

7. An electrical apparatus comprising, in combination, a closed, gas-tight container, an electric device therein having at least one conducting member from which an electrical discharge may occur, and an electronegatively substituted dielectric mixture in said container and in contact with said conducting member, said electronegatively substituted dielectric fluid mixture consisting essentially of a saturated trihalomethane, wherein said halogen is of atomic number not more than 35 and having at least one fluorine atom, and from 1 to 50 mole percent of an oxidizing agent selected from the group consisting of sulfur dioxide, nitric oxide, and nitrous oxide.

8. An electrical apparatus comprising, in combination, a closed, gas-tight container, an electric device therein having at least one conducting member from which an electrical discharge may occur, and an electronegatively substituted dielectric fluid mixture in said container and in contact with said conducting member, said electronegatively substituted dielectric fluid mixture consisting essentially of a $C_1$–$C_6$ saturated perhalohydrocarbon, wherein said halogen is of atomic number no more than 35 and having at least one fluorine atom, and from 1 to 50 mole percent of an oxidizing agent selected from the group consisting of sulfur dioxide, nitric oxide, and nitrous oxide.

9. An electrical apparatus comprising, in combination, a closed, gas-tight container, an electric device therein having at least one conducting member from which an electrical discharge may occur, and an electronegatively substituted dielectric fluid mixture in said container and in contact with said conducting member, said electronegatively substituted dielectric fluid mixture consisting essentially of a $C_2$–$C_8$ saturated perfluoroether and from 1 to 50 mole percent of an oxidizing agent selected from the group consisting of sulfur dioxide, nitric oxide, and nitrous oxide.

10. An electrical apparatus comprising, in combination, a closed, gas-tight container, an electric device therein having at least one conducting member from which an electrical discharge may occur, and an electronegatively substituted dielectric fluid mixture in said container and in contact with said conducting member, said electronegatively substituted dielectric fluid mixture consisting essentially of a $C_3$–$C_{12}$ saturated perfluorotertiary amine and from 1 to 50 mole percent of an oxidizing agent selected from the group consisting of sulfur dioxide, nitric oxide, and nitrous oxide.

11. An electronegatively substituted dielectric fluid mixture consisting essentially of a carbon containing fluid selected from the group consisting of trihalomethane and $C_1$–$C_6$ saturated perhalohydrocarbon, wherein said halogen is of atomic number not more than 35 and having at lease one fluorine atom, $C_2$–$C_8$ saturated perfluoroether, and $C_3$–$C_{12}$ saturated perfluorotertiary amine, and from 1 to 50 mole percent of an oxidizing agent selected from the group consisting of sulfur dioxide, nitric oxide, and nitrous oxide.

12. An electronegatively substituted dielectric fluid mixture consisting essentially of a trihalomethane wherein said halogen is of atomic number not more than 35 and having at least one fluorine atom, and from 1 to 50 mole percent of an oxidizing agent selected from the group consisting of sulfur dioxide, nitric oxide, and nitrous oxide.

13. An electronegatively substituted dielectric fluid mixture consisting essentially of a $C_1$–$C_6$ saturated perhalohydrocarbon, wherein said halogen is of atomic number not more than 35 and having at least one fluorine atom, and from 1 to 50 mole percent of an oxidizing agent selected from the group consisting of sulfur dioxide, nitric oxide and nitrous oxide.

14. An electronegatively substituted dielectric fluid mixture consisting essentially of a $C_2$–$C_8$ saturated perfluoroether and from 1 to 50 percent of an oxidizing agent selected from the group consisting of sulfur dioxide, nitric oxide, and nitrous oxide.

15. An electronegatively substituted dielectric fluid mixture consisting essentially of a $C_3$–$C_{12}$ saturated perfluorotertiary amine and from 1 to 50 mole percent of an oxidizing agent selected from the group consisting of sulfur dioxide, nitric oxide, and nitrous oxide.

16. An electronegatively substituted dielectric fluid mixture consisting essentially of perfluorocyclobutane and from 1 to 50 mole percent of an oxidizing agent selected from the group consisting of sulfur dioxide, nitric oxide, and nitrous oxide.

17. An electronegatively substituted dielectric fluid mixture consisting essentially of perfluorocyclobutane and from 1 to 50 mole percent sulfur dioxide.

18. An electronegatively substituted dielectric fluid mixture consisting essentially of chloropentafluoroethane and from 1 to 50 mole percent nitrous oxide.

19. An electronegatively substituted dielectric fluid mixture consisting essentially of cyclic $C_8F_{16}O$ (2-perfluoro-butyl-perfluorotetrahydrofuran) and from 1 to 50 mole percent nitric oxide.

20. An electronegatively substituted dielectric fluid mixture consisting essentially of tris(trifluoromethyl) amine and from 1 to 50 mole percent sulfur dioxide.

References Cited by the Examiner
UNITED STATES PATENTS

| | | | |
|---|---|---|---|
| 1,307,930 | 6/19 | Schmidt et al. | 204—169 |
| 1,710,155 | 4/29 | Egloff et al. | 204—169 |
| 2,077,429 | 4/37 | McMahon | 252—66 |
| 2,500,388 | 3/50 | Simons | 252—65 |
| 2,561,738 | 7/51 | Hill | 252—65 |

JULIUS GREENWALD, *Primary Examiner.*

JOSEPH R. LIBERMAN, *Examiner.*

UNITED STATES PATENT OFFICE
CERTIFICATE OF CORRECTION

Patent No. 3,184,533                                                  May 18, 1965

Bernhardt J. Eiseman, Jr.

It is hereby certified that error appears in the above numbered patent requiring correction and that the said Letters Patent should read as corrected below.

Column 4, lines 21 to 25, strike out "Perfluorocyclobutane 570 mm. Hg, 75 mole percent of sure to 760 mm. Hg pressure (partial pressure of perfluorocyclobutane and 570 mm. Hg, 75 mo percent of gas mixture)." and insert instead -- Perfluorocyclobutane is then charged to bring the total pressure to 760 mm. H pressure (partial pressure of perfluorocyclobutane 570 mm. Hg, 75 mole percent of gas mixture). --; column 5, line 73, after "and" insert -- having --.

Signed and sealed this 16th day of November 1965.

(SEAL)
Attest:

ERNEST W. SWIDER                                        EDWARD J. BRENNER
Attesting Officer                                             Commissioner of Patents